(12) United States Patent
Su et al.

(10) Patent No.: US 12,346,530 B2
(45) Date of Patent: *Jul. 1, 2025

(54) ROLL MAP FOR ELECTRODE COATING PROCESS AND ROLL MAP CREATION METHOD AND SYSTEM

(71) Applicant: LG ENERGY SOLUTION, LTD., Seoul (KR)

(72) Inventors: Jun Hyo Su, Daejeon (KR); Jong Seok Park, Daejeon (KR); Dong Yeop Lee, Daejeon (KR); Ki Deok Han, Daejeon (KR); Byoung Eun Han, Daejeon (KR); Seung Huh, Daejeon (KR); Ju Yeon Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/801,345

(22) Filed: Aug. 12, 2024

(65) Prior Publication Data

US 2024/0402867 A1    Dec. 5, 2024

Related U.S. Application Data

(63) Continuation of application No. 18/012,581, filed as application No. PCT/KR2022/003446 on Mar. 11, 2022.

(30) Foreign Application Priority Data

Mar. 26, 2021    (KR) .................. 10-2021-0039801

(51) Int. Cl.
*H01M 4/04*    (2006.01)
*B05C 11/00*    (2006.01)
(Continued)

(52) U.S. Cl.
CPC .......... *G06F 3/04812* (2013.01); *B05C 11/00* (2013.01); *G01N 21/8422* (2013.01);
(Continued)

(58) Field of Classification Search
CPC ....... G06F 3/04812; B05C 11/00; B05C 5/02; H01M 4/04; H01M 4/0404; H01M 4/0409; G01N 2021/888; G01N 2021/8887
See application file for complete search history.

(56) References Cited

U.S. PATENT DOCUMENTS 7,797,133 B2 *    9/2010    Floeder .................. G01N 21/89
                                                        702/183
11,585,762 B2 *    2/2023    Brittain ................ G06T 3/4038
(Continued)

FOREIGN PATENT DOCUMENTS

CN    102125907 A    7/2011
CN    102224411 A    10/2011
(Continued)

*Primary Examiner* — Haoshian Shih
(74) *Attorney, Agent, or Firm* — Bryan Cave Leighton Paisner LLP (57)    ABSTRACT

A roll map of an electrode coating process includes a roll map bar and a representation part. The roll map bar is displayed on a screen in synchronization with movement of an electrode between an unwinder and a rewinder while being coated with an electrode slurry in a roll-to-roll state. The roll map bar is displayed in the form of a bar by simulating the electrode in the roll-to-roll state. The representation part is configured to visually show either one of or both quality-related and defect-related acquired data associated with the electrode coating process. The acquired data is shown at a certain location on the roll map bar corresponding to a location in the electrode at which the data is measured. A roll map of an electrode coating process is generated by a process. A roll map of an electrode coating process is generated by a system.

23 Claims, 6 Drawing Sheets

(51) Int. Cl.
  *G01N 21/84* (2006.01)
  *G06F 3/04812* (2022.01)
  *B05C 5/02* (2006.01)
(52) U.S. Cl.
  CPC ............... *H01M 4/04* (2013.01); *B05C 5/02* (2013.01); *G01N 2021/8427* (2013.01); *H01M 4/0404* (2013.01); *H01M 4/0409* (2013.01)

(56) References Cited

U.S. PATENT DOCUMENTS

2001/0031079 A1* 10/2001 Ryder ................... G06T 7/0004
  382/141
2012/0013733 A1   1/2012 Koltermann et al.

FOREIGN PATENT DOCUMENTS

| | | |
|---|---|---|
| CN | 111446456 A | 7/2020 |
| EP | 2407309 A2 | 1/2012 |
| JP | 3789519 B2 | 6/2006 |
| JP | 4582326 B2 | 11/2010 |
| JP | 4983336 B2 | 7/2012 |
| JP | 2014059833 A | 4/2014 |
| JP | 2015002149 A | 1/2015 |
| JP | 2020064718 A | 4/2020 |
| KR | 1020060027260 A | 3/2006 |
| KR | 10-2016-0061756 A | 6/2016 |
| KR | 1020170024498 A | 3/2017 |
| KR | 101731983 B1 | 5/2017 |
| KR | 1020180061439 A | 6/2018 |
| KR | 1020190134068 A | 12/2019 |
| KR | 1020190143253 A | 12/2019 |
| KR | 102206908 B1 | 1/2021 |

* cited by examiner

ROLL MAP FOR ELECTRODE COATING PROCESS AND ROLL MAP CREATION METHOD AND SYSTEM

CROSS-REFERENCE TO RELATED APPLICATIONS

The present application is a continuation of U.S. patent application Ser. No. 18/012,581 filed on Dec. 22, 2022, which is a National phase entry under 35 U.S.C. § 371 of International Application No. PCT/KR2022/003446 filed on Mar. 11, 2022, which claims priority from Korean Patent Application No. 10-2021-0039801 filed on Mar. 26, 2021, all of which are hereby incorporated herein by reference in their entireties.

FIELD

The present invention relates to a roll map of an electrode coating process and a method of generating the roll map. More specifically, the present invention relates to a roll map of an electrode coating process, which allows understanding of quality and defect information of the electrode coating process at a glance by visualizing data on quality or defects measured by various measuring instruments in the electrode coating process on the roll map that simulates an electrode shape, and a method of generating the roll map.

Also, the present invention relates to a system for generating a roll map of an electrode coating process.

BACKGROUND

With the technological development of mobile devices and an increase in demand for mobile devices, the demand for secondary batteries is also rapidly increasing. Among secondary batteries, a lithium secondary battery is widely used as an energy source for various electronic products as well as various mobile devices because the lithium secondary battery has a high energy density and operating voltage and excellent preservation and lifetime characteristics.

The so-called electrode process for manufacturing an electrode of a lithium secondary battery includes a coating process of forming a positive electrode and a negative electrode by coating the surface of a metal electrode plate, which is a current collector, with an active material and a certain insulating material, a roll pressing process of rolling the coated electrode, and a slitting process of cutting the rolled electrode according to the dimension.

In the electrode manufactured in the electrode process, an electrode tab is formed through a notching process. Then, the form of a secondary battery is made through an assembly process of interposing a separator between the anode and the cathode to form an electrode assembly, stacking or folding the electrode assembly to package it in a pouch, can, etc. and injecting an electrolyte. After that, the assembled secondary battery undergoes an activation process of imparting battery characteristics by charging and discharging the secondary battery and becomes a final secondary battery as a finished product.

When an inspection device detects a foreign material mixed in the active material layer or a poor coating part in the electrode coating process, according to the conventional art, it is marked on the electrode or an operator attaches a defect badge to the electrode such that defective parts can be removed in the coating process or a follow-up process (see Patent Document 1).

However, in the case of marking directly on an electrode, it is difficult to mark a coated part of the electrode, and thus there is no choice but to mark a non-coated part. Therefore, for example, when an appearance defect occurs in the coated part, a marking is made on the non-coated part rather than the coated part having the actual defect, and thus it is difficult to display the exact location of a fault or defect. In addition, Patent Document 1 employs a physical marking process of directly marking an electrode with information related to quality, defects, etc. Accordingly, once a secondary battery is manufactured with electrodes, even when a defect occurs in a follow-up process due to a defect caused in the electrode process, it is difficult to find the section of the electrode process in which the defect was actually caused. In other words, after a physically marked electrode is used for assembly or disappears, it is very difficult to analyze the quality correlation between the electrode process or the electrode coating process and a follow-up process.

Meanwhile, a technology for marking whether there is a defect with ink directly on a corresponding secondary battery in a secondary battery assembly line after an electrode process is completed so that a work history can be checked in units of secondary batteries has been proposed (see Patent Document 2).

Since the above conventional art relates to marking after assembly of a secondary battery, it is possible to check a secondary battery assembly process and a subsequent history. However, it is not possible to check history information about defects and the like in an electrode coating process which is a previous process. In other words, Patent Document 2 relates to a technology for physically marking a secondary battery during or after secondary battery assembly and thus is unrelated to the product history of quality and defects in an electrode coating process. Accordingly, it is likewise not possible to analyze the quality relationship between an electrode process and an assembly process.

In addition, neither of the above patent documents provides non-defect information, for example, information on the amount of loading, dimensions, a width, etc. in the electrode process. For example, there may be no defect in an electrode coating process, but a defect such as a fire or the like may occur in a follow-up process or a process of using the secondary battery. In this case, it is necessary to find the cause of the defect by retracing the product history of the battery up to the electrode coating process, but with the technologies proposed in the above-described patent documents, it is not possible to find the cause.

Consequently, to find the cause of a defect occurring in a follow-up process or after the assembly process of a secondary battery, it is required to develop a technology for displaying or preserving history information of quality or defects in an electrode coating process which allows quality relationship analysis in a relationship with a follow-up process.

PRIOR ART DOCUMENTS (Patent Document 1) Japanese Patent Application Publication No. 2015-2149 (Jan. 5, 2015)
(Patent Document 2) Korean Patent Publication No. 10-1731983 (May 2, 2017)

SUMMARY OF THE INVENTION

The present invention has been made to solve the above problems, an object of the present invention is to provide a roll map of an electrode coating process, which allows understanding of quality and defect information in the electrode coating process at a glance by visualizing quality-related or defect-related data of the electrode coating process on the roll map that simulates an electrode shape, and a method of generating the roll map.

Another object of the present invention is to provide a system for generating a roll map of an electrode coating process.

A roll map of an electrode coating process according to the present invention in order to solve above problems includes: a roll map bar that is displayed on a screen in synchronization with movement of an electrode, which is coated with electrode slurry while moving between an unwinder and a rewinder, in a roll-to-roll state and is displayed in the form of a bar by simulating the electrode in the roll-to-roll state; and a representation part configured to visually show at least one of quality-related and defect-related data measured in the electrode coating process at a predetermined location on the roll map bar corresponding to a location in the electrode at which the data is measured.

As an example, a longitudinal dimension of the electrode may be displayed at predetermined intervals in a longitudinal direction of the roll map bar.

As a specific example, a detailed data including a lot number of the electrode installed between the unwinder and the rewinder in the roll-to-roll state may be displayed together with the roll map bar.

Specifically, the at least one of the quality-related and defect-related data may be measured by a predetermined measuring instrument or operator and then displayed.

As a specific example, the quality-related or defect-related data may be 1) data on at least one of electrode dimensions and width, 2) data on a mismatch between a coated electrode part and non-coated electrode part, 3) electrode slurry loading amount data, 4) electrode appearance defect data, 5) data on the location of a disconnected section or inter-electrode connection, 6) data on a location of a sample examination unit, 7) data on an electrode discard section, 8) data on insulating quality or defects in an insulating material coating process performed after electrode slurry coating, and 9) other defect data.

As an example, when a specific range of the roll map bar on the screen is specified and clicked, at least one of the quality-related and defect-related data in a range on the electrode corresponding to the specific range may be visually displayed on the screen separately from the roll map bar.

As another example, when the electrode appearance defect data on the roll map bar is clicked, an appearance image of the electrode photographed by an appearance inspection device may be visually displayed on the screen separately from the roll map bar.

As a specific example, when the appearance image is displayed, detailed information including location coordinates of an appearance defect photographed by the appearance inspection device may be displayed together with the external image.

As an example, the roll map may be displayed on the screen for each lane on the electrode where the electrode slurry is coated.

As another example, when the electrode is a double-sided electrode, roll maps for a top surface and a bottom surface of the double-sided electrode may be displayed on the same screen.

As another example, at least one of data on a input status of electrode foil, the electrode slurry, and an insulating material input to the electrode coating process and data on a loading amount of the electrode slurry input to the electrode coating process may be visually displayed on the screen in parallel with the roll map in a longitudinal direction of the roll map.

As another aspect of the present invention, a method of generating a roll map of an electrode coating process includes: acquiring at least one of quality-related data and defect-related data in the electrode coating process by inspecting an electrode coating process of coating an electrode slurry on an electrode that is moved between the unwinder and the rewinder in a roll-to-roll state; transmitting the acquired data to a server together with data on a location in the electrode at which the data is acquired; and displaying, by a data processing system interconnecting with the server, a roll map bar having a bar shape which simulates an electrode in the roll-to-roll state on a screen in synchronization with movement of the electrode between the unwinder and the rewinder and visually displaying the at least one of the quality-related and defect-related data of the electrode coating process at a certain location on the roll map bar corresponding to the data on the location in the electrode.

As an example, the method may further include, when an electrode roll is installed in the roll-to-roll state between the unwinder and the rewinder before the electrode coating process, an electrode roll information registration operation of inputting detailed data including a lot number of the electrode to the server is preceded, and the detailed data may be displayed on the screen together with a roll map.

As another example, the at least one of the quality-related and defect-related data may be acquired when a predetermined measuring instrument or operator inspects the electrode coating process, and the data acquired by the operator may be transmitted to the server by a manual input of the operator.

As a specific example, the predetermined measuring instrument may be at least one of an electrode slurry loading amount measuring instrument, a dimension and width measuring instrument, and an appearance inspection device.

As an example, location data based on a longitudinal direction of the electrode may be detected by an encoder installed on the unwinder or the rewinder.

As a more specific example, location data based on a width direction of the electrode may be detected by a predetermined measuring instrument which checks the electrode coating process.

As an example, the method may further include: the quality-related data or the defect-related data may be compared with quality data stored in a database installed in a data processing system or installed to interconnect with the data processing system, and the quality-related data or defect-related data which is determined to deviate from normal quality data as a result of the comparison may be marked on the roll map bar to be visually distinguished from other parts.

As another example, the method may further include: visually displaying at least one of data on a current input status of electrode foil, the electrode slurry, and an insulating material input to the electrode coating process and data on a loading amount of the electrode slurry input to the electrode coating process on the screen in parallel with the roll map in a longitudinal direction of the roll map.

As still another aspect of the present invention, a system for generating a roll map of an electrode coating process comprises: a measuring device configured to inspect an electrode coating process, acquire at least one of quality-related data and defect-related data of the electrode coating process, and transmit the acquired data to a server together with data on a location in an electrode at which the data is acquired; the server configured to store the data received from the measuring device; a data processing system configured to interconnect with the server to display a roll map bar having a bar shape simulating an electrode in a roll-to-roll state in synchronization with movement of the electrode between an unwinder and a rewinder, and to generate a role map on the basis of the quality-related or defect-related data received from the server and the data on the location in the electrode at which the data is acquired, wherein the roll map visually displays the at least one of the quality-related and defect-related data at a certain location on the roll map bar corresponding to the data on the location in the electrode; and a display unit connected to the data processing system and configured to display the roll map on a screen.

According to the present invention, quality-related or defect-related data can be displayed on a roll map bar which is shown to simulate a roll-to-roll state on a screen, and thus it is possible to easily visually understand quality-related or defect-related data of an electrode coating process at a glance.

Also, according to the present invention, an electrode or secondary battery is not directly marked, and quality-related or defect-related data is displayed on a roll map bar shown on a screen. Accordingly, it is possible to accurately display quality-related or defect-related data in a coated part as well as a non-coated part.

Further, an electrode or battery is not directly marked, and data is displayed in a roll map on a screen. Accordingly, even when an electrode is used for assembly or a battery is manufactured with the electrode in a follow-up process, it is possible to easily find the cause of a post-assembly fault or defect from the roll map data of the corresponding electrode as long as the lot number of the battery or electrode is known. Therefore, it is possible to carry out inter-process quality relationship analysis with high accuracy.

DETAILED DESCRIPTION

Hereinafter, the present invention will be described in detail with reference to the accompanying drawings and several embodiments. The following embodiments are exemplary and set forth herein to facilitate understanding of the present invention. The accompanying drawings are not drawn to actual sale, and dimensions of some components may be exaggerated to facilitate understanding of the present invention.

Since the present invention can be variously modified and have a variety of forms, specific embodiments will be illustrated in drawings and described in detail. However, the embodiments are not intended to limit the present invention to a specific form and encompass all changes, equivalents, and substitutions within the spirit and technical scope of the present invention.

Figure 1:
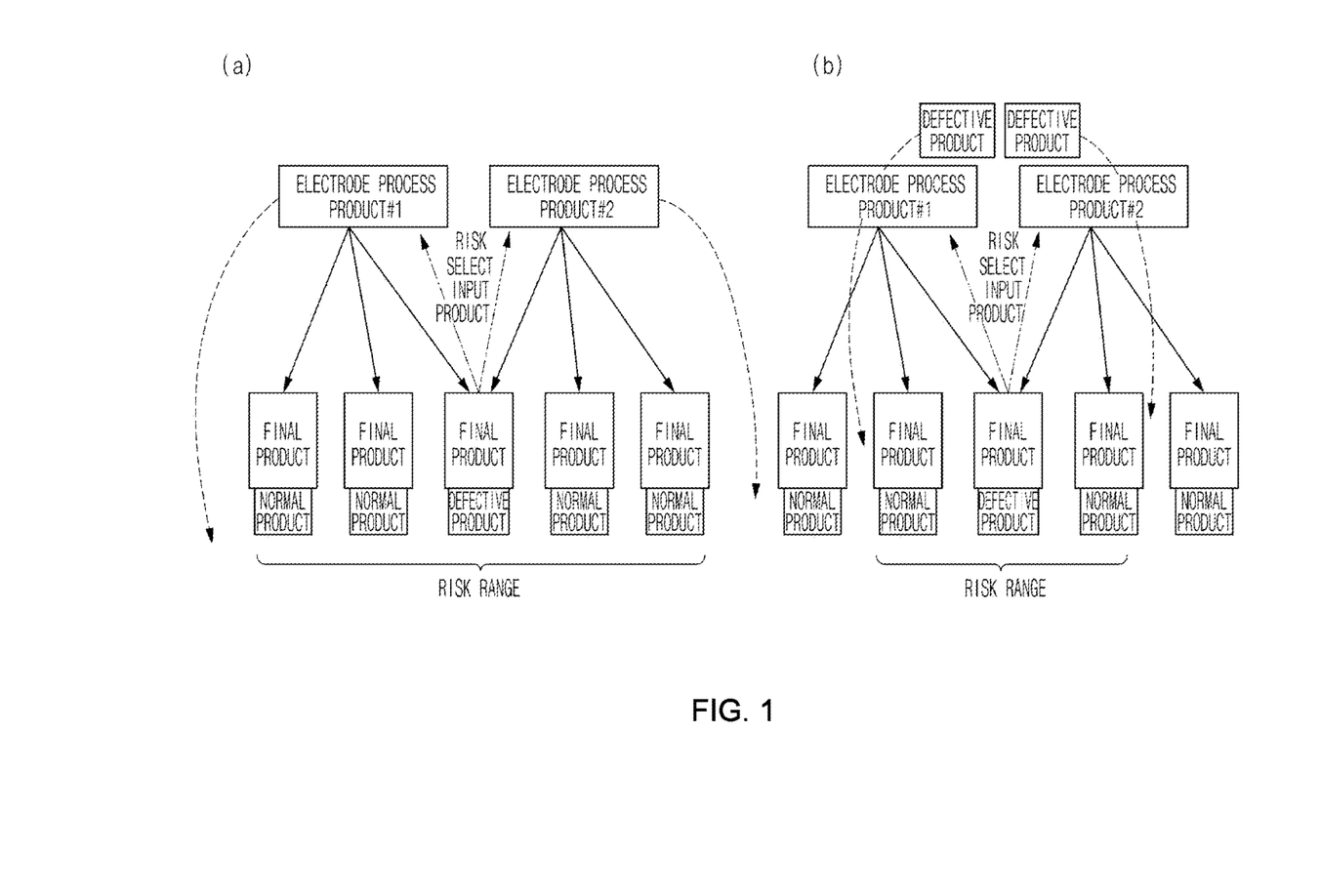
FIG. 1 is a schematic diagram illustrating a change in risk range according to the quality relationship analysis between an electrode process and a final product.

FIG. 1 is a schematic diagram illustrating a change in risk range according to the quality relationship analysis between an electrode process and a final product.

As shown in FIG. 1A, a final product (secondary battery) is manufactured with a product (electrode) manufactured in an electrode process. When a defect occurs in the final product, it is necessary to check the history of manufacturing in some cases in order to find the cause of the defect. However, when there is no information or insufficient information on the manufacturing history of the product in the electrode process, it is difficult to know which electrode process produced the defective final product. Accordingly, to prevent reoccurrence of the same defect, it is necessary to include other final products as well as the defective product in a risk range in which a defect may occur and discard all the products in the risk range in some cases.

On the other hand, when there is sufficient information on the manufacturing history of the product in the electrode process, a risk range may be reduced on the basis of the information as shown in FIG. 1B, and the number of favorable products to be discarded may be reduced accordingly. In particular, an electrode is manufactured through various processes, such as an electrode coating process, a roll pressing process, a slitting process, etc. Accordingly, unless the product history information of each process is clearly recorded or preserved, it may be difficult to specify the cause of a defect in the relationship with a follow-up process.

Therefore, it is necessary to develop a technology for recording information on product quality or defects in an electrode process, particularly, an electrode coating process which determines the quality of an electrode, and tracking and analyzing the quality relationship between the electrode process and a follow-up process or a final product.

Also, as described above, there is a limit to directly marking an electrode coated with electrode slurry with all defect information due to physical limitations of the electrode space. Further, in some cases, information related to the quality of a non-defective electrode in a coating process may be required for finding the cause of a fault unexpectedly occurring in a subsequent process or a process of using a secondary battery which is a finished product.

Therefore, the present inventors have developed a roll map that overcomes limitations of the related art and is very effective in inter-process quality relationship analysis by displaying quality-related information as well as defect-related information of an electrode coating process on a roll map bar having a bar shape which simulates an electrode coated with electrode slurry or an insulating material rather than directly on the electrode.

Figure 2:
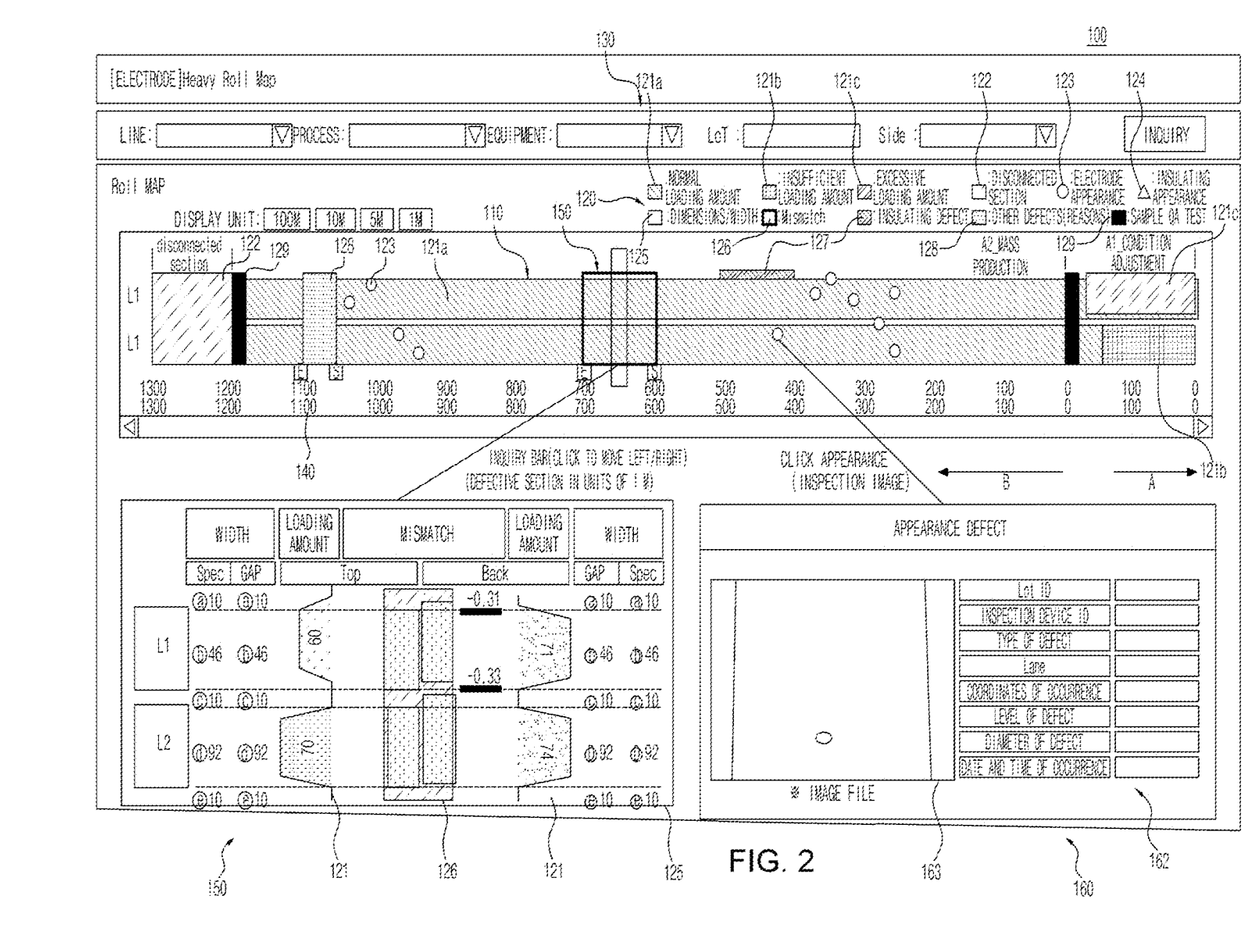
FIG. 2 is a diagram illustrating a roll map of an electrode coating process according to an embodiment.

FIG. 2 is a diagram illustrating a roll map 100 of an electrode coating process according to an embodiment.

The roll map 100 of an electrode coating process includes a roll map bar 110 which is displayed in a bar shape by simulating an electrode in a roll-to-roll state and a representation part in which at least one of quality-related and defect-related data measured in an electrode coating process is visually showed on the roll map bar 110.

The roll map bar 110 simulates the actual electrode that is installed and moved in the roll-to-roll state between an unwinder and a rewinder. The start point and end point of the roll map bar 110 and a part of the roll map bar 110 between the start point and end point are displayed on a screen in synchronization with the path of an electrode which moves between the unwinder and the rewinder. For example, when an electrode roll to be coated has a length of 3000 m, the roll map bar 110 simulating the electrode is also reduced to a predetermined scale (ratio) and displayed on the screen. Also, when a specific electrode roll is installed between the unwinder and the rewinder, detailed information including a lot number, the width of the electrode roll, etc. may be acquired, and thus the roll map bar 110 that is reduced to a predetermined ratio of length and width because not only the length of the electrode (roll) but also the width is reduced to the predetermined scale may be displayed on the screen. Accordingly, the length and width of the roll map bar 110 correspond to the length and width of an actually moving electrode at the predetermined ratio. Also, when a specific location in the electrode is indicated by, for example, coordinates that are represented in units of the dimensions of the length and width of the electrode, the coordinates may also be reduced at the predetermined ratio and displayed on the roll map bar 110. In FIG. 2, a longitudinal direction dimension (in units of 100 m) 140 of the electrode is displayed at predetermined intervals in the longitudinal direction of the roll map bar 110.

Further, the roll map bar 110 is synchronized with the electrode (path) which actually moves between the unwinder and the rewinder while being coated or the electrode movement. Accordingly, even when coating is performed to adjust coating conditions before actual coating is performed, the coating status of a corresponding part may be displayed on the roll map bar 110. Therefore, the roll map bar 110 may be divided into a condition adjustment part A for adjusting coating conditions and a mass-production part B in which actual coating is performed under the adjusted coating conditions.

When the electrode is disconnected in the coating process and there is a section (a disconnected section 122) for connecting the disconnected electrodes, the disconnected section 122 may be displayed on the roll map bar 110.

While the roll map bar 110 represents an electrode path in synchronization with actual electrode movement, the representation part shown on the roll map bar 110 is a part in which quality-related or defect-related data of an actual electrode coating process is displayed. In this specification, "quality-related or defect-related data of an electrode coating process" includes not only data on actual defects, such as an appearance defect, an insulation defect, a mismatch between a coated electrode part and a non-coated electrode part, etc., but also data of normal ranges, such as loading amount data, dimension and width data, etc., data on an electrode location for sample examination, etc. In other words, as long as there is a measuring instrument for measuring specific quality in an electrode coating process, all data measured by the measuring instrument may be displayed on a roll map in theory. Accordingly, in this specification "quality-related or defect-related data of an electrode coating process" includes normal data as well as data on defects and additionally indicates all quality-related data that may be quantified or visually displayed on a roll map.

In this specification, "visually displayed" data or "visualization" of data may be defined as visually recognizing and representing corresponding data on a roll map bar having a bar shape which simulates an electrode using at least one of shape, color, size, pattern, contrast, transparency, various symbols, numbers, letters, and other visually recognizable things. Also, not only a part displayed in a shape, color, etc. at a specific location on a roll map but also a part visually displayed in a shape, color, etc. in a specific range or the entire range of a roll map bar may be defined as the "representation part in which data is visually showed." For example, when data on an electrode slurry loading amount is represented in a color or the like all over a roll map bar, a representation part may not be a part of the roll map bar but may be the entire roll map bar. Although each representation part is hatched for distinguishment in the drawings of this specification, the corresponding representation part may be colored for distinguishment.

Since the roll map bar 110 simulates an electrode being actually coated, it is preferable to display detailed information on an actual electrode (roll) installed between the unwinder and the rewinder together with the roll map bar 110.

At the upper end of the screen of FIG. 2, detailed data 130 on a production line, a process, production equipment, a side of the electrode, etc. is displayed in addition to the lot number of an electrode roll. From the detailed data 130, not only the previous process history information of an electrode roll provided in a coating process but also additional coating-related information, such as in which line or equipment the corresponding coating process was performed, whether a single side or double sides of the electrode have been coated, etc., or information on the details of the electrode roll may be acquired. When a keyword relating to the line, the process, the production equipment, or the side of the electrode is input by clicking an inquiry button displayed on the upper right side of the screen, the roll map 100 or the roll map bar 110 corresponding to the menu may be displayed on the screen.

At least one of quality-related or defect-related data 120 displayed on the roll map bar 110 may be measured by a predetermined measuring instrument or an operator. In other words, data acquired in an electrode coating process by a measuring instrument, such as a loading amount thickness measuring instrument, an appearance inspection device, etc. may be displayed on the roll map bar 110. In addition, a defect detected by the operator with the naked eye in the electrode coating process, the section 122 in which the electrode is cut and manually connected, etc. may also be manually input to a server or the like and displayed as specific data on the roll map bar 110. Like this, not only data automatically acquired by a measuring instrument but also quality-related or defect-related data acquired by an operator in an electrode coating production line can be displayed on the roll map 100, and thus a quality relationship can be traced more easily.

Quality-related or defect-related data that may be displayed on the roll map bar 110 according to an embodiment or acquired from the roll map will now be described in detail with reference to FIG. 2. The quality-related or defect-related data 120 displayed on the roll map bar 110 of FIG. 2 is 1) data 125 on at least one of electrode dimensions and width, 2) data 126 on a mismatch between a coated electrode part and a non-coated electrode part, 3) electrode slurry loading amount data 121, 4) electrode appearance defect data 123, 5) the data 122 on the location of a disconnected section or inter-electrode connection, 6) data 129 on the location of a sample examination unit, 7) data on the location of an electrode discard section, 8) data 124 and 127 on insulating quality or defects in an insulating material coating process performed after electrode slurry coating, and 9) other defect data 128.

To display the quality-related or defect-related data 120, data names represented in a specific color, form, shape, etc. may be simply displayed at the upper end of the screen. Actual data displayed in such a color, form, and shape may be displayed at a specific location on the roll map bar 110 or over a specific range of the roll map bar 110.

Specifically, when the dimensions or width of an electrode deviates from a normal range, the data 125 on this may be displayed on the roll map.

Also, the data 126 on a mismatch in which the widths of a coated part and a non-coated part deviate from a set range may also be displayed on the roll map.

Also, the data 121 on an electrode slurry loading amount that is normal 121a, insufficient 121b, or excessive 121c may be displayed with hatch marks over a specific range on the roll map bar 110.

Also, the electrode appearance defects 123 are displayed as circles at specific spots on the roll map bar 110.

Also, the disconnected section 122 at which the disconnected electrode is connected with a coupling member, such as polyethylene terephthalate (PET), is displayed at the left end of the roll map bar 110. The case of directly connecting electrodes without any coupling member may be displayed on the roll map. When the operator performs such electrode connection, the operator may directly input data or location information of the corresponding section to the server and display the data or location information on the roll map 100.

Also, the electrode parts 129 provided for sample examination may also be displayed on the roll map 100.

Although not shown in FIG. 2, data on a discarded section of the electrode may be displayed on the roll map. For example, the outermost section of the coated electrode is cut off and discarded. The roll map 100 may display information on even such a discarded section.

Since not only electrode slurry coating but also coating the boundary between the coated part and the non-coated part with an insulating material is performed in the electrode coating process, the data on insulating defects 127 or insulating appearance defects 124 may be displayed on the roll map bar 110. In this regard, an "electrode coating process" of this specification includes "coating of an insulating material" in addition to "coating of electrode slurry."

Also, the data 128 on defects other than appearance defects or insulating defects may be displayed on the roll map bar 110. The data 128 on other defects corresponds to other defects when displayed in the electrode coating process. However, when the other defects turn out to be specific defects after the coating is completed or in a follow-up process, the other defects may be changed to the specific defects and displayed on the roll map 100. When any defect occurs in a follow-up process, the other defect data may be important data for finding the cause of the defect.

When the quality-related or defect-related data 120 is displayed on the roll map bar 110 synchronized with an electrode path as described above, it is possible to recognize quality-related history information of an electrode coating process.

Also, as shown in FIG. 2, when a specific range of the roll map bar 110 on the screen is specified and clicked, at least one of the quality-related or defect-related data 120 of a range on the electrode corresponding to the specific range may be visually displayed on the screen separately from the roll map bar 110. When the mismatch section 126 of the roll map bar in FIG. 2 is clicked, detailed information 150 of the mismatch 126, the loading amount 121 in the mismatch section, and the width-related information 125 may be checked on the left side under the roll map bar 110. Such a range may be specified by clicking while moving an inquiry bar, and a defective section may be specified in length units (e.g., 1 m) to check detailed data of the corresponding range. Although a loading amount for only one side of the electrode is shown above the upper roll map bar 110, the roll map may be configured to check the loading amounts of the top surface and the bottom surface of the electrode in the detailed information.

Meanwhile, when the electrode appearance defect data 123 on the roll map bar 110 is clicked, an appearance image 163 of the electrode photographed by the appearance inspection device may be visually displayed on the screen separately from the roll map bar. The appearance defect image 163 shown by clicking the appearance defect data 123 is enlarged and displayed on the right side under the roll map bar. Also, when the appearance image is displayed, the detailed information 162 including the location coordinates of an appearance defect imaged by the appearance inspection device may also be displayed together with the appearance image 163 on the screen. The detailed information 162 may include information on the lot identifier (ID) of the electrode, which is the target of the roll map bar, the ID of the appearance inspection device, the type of appearance defect, a lane of the electrode, the location coordinates, the grade, the diameter, and the date of occurrence of the appearance defect. Since the information is stored in the server, the information may be called from the server and separately displayed on the screen by clicking an appearance defect image on the roll map bar. In this way, according to the present embodiment, appearance information 160 including the appearance image 163 and the detailed information 162 on appearance defects may be separately displayed on the screen.

The roll map 100 of the embodiment shown in FIG. 2 is displayed on the screen for each lane L1 and L2 on the electrode where the electrode slurry is coated. Since the coated part of the electrode which is coated with electrode slurry may be formed at certain intervals or in a certain pattern on electrode foil, the roll map 100 may be generated for each of the lanes L1 and L2 coated with electrode slurry. FIG. 2 shows the roll map of the two lanes L1 and L2.

Figure 3:
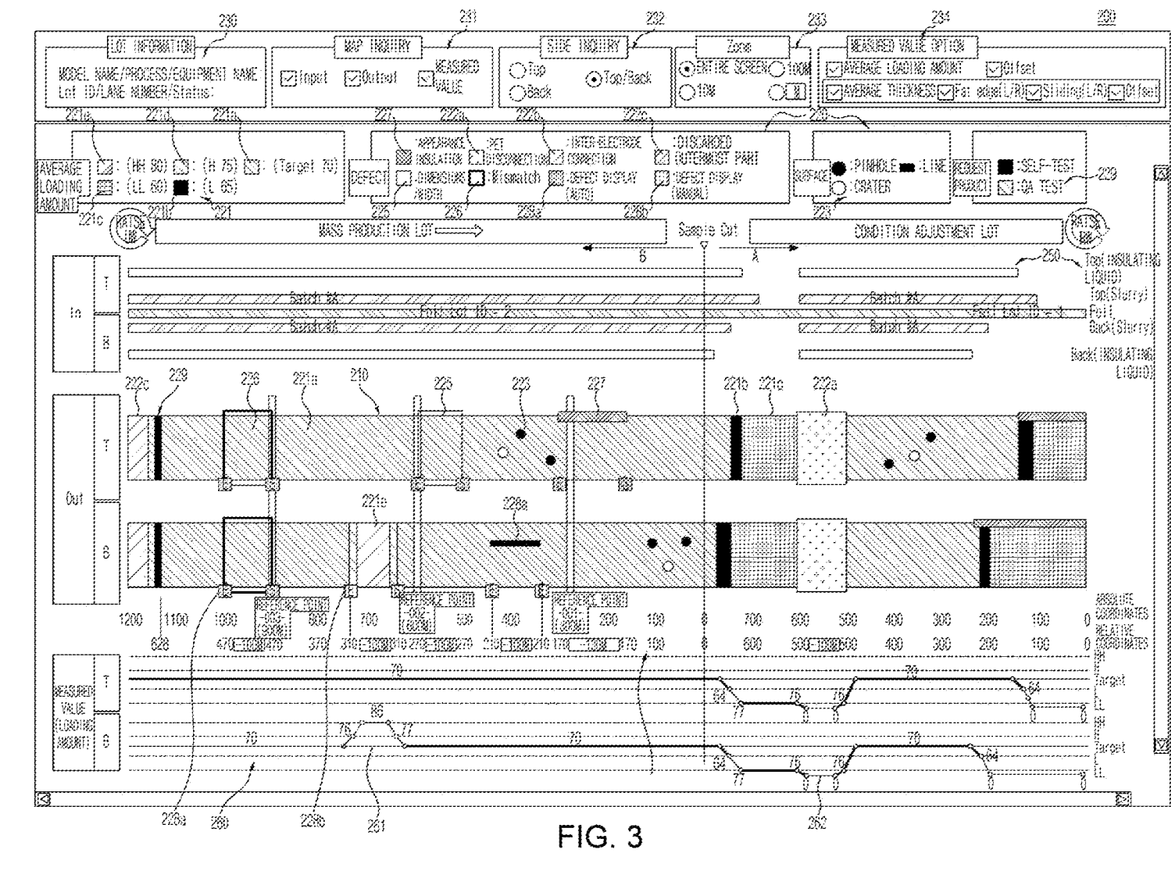
FIG. 3 is a diagram illustrating a roll map of an electrode coating process according to another embodiment.

FIG. 3 is a diagram illustrating a roll map 200 of an electrode coating process according to another embodiment.

The roll map 200 of the present embodiment is the roll map of a double-sided electrode having a top surface T and a bottom surface B both coated with electrode slurry. the roll map 200 for the top surface T of the double-sided electrode and the roll map 200 for the bottom surface B are displayed on the same screen, in an upper part and lower part of the screen, respectively. Accordingly, data 220 on quality or defects related to coating with electrode slurry or an insulating material applied onto both surfaces can be clearly understood in comparison with each other.

Also, in the roll map 200 of the present embodiment, data 250 on the input status of electrode foil, the electrode slurry, and the insulating material input to the electrode coating process and data 260 on the loading amount of the electrode slurry input to the electrode coating process is visually displayed on the screen in parallel with the roll map 200 in the longitudinal direction of the roll map.

At the upper end of the screen, the electrode foil, the electrode slurry, and the insulating material input to the electrode coating process are displayed. Long bars representing the electrode foil, the electrode slurry, and the insulating material extend in the longitudinal direction of the roll map 200 in parallel with the roll map from the left side to the right side on the screen. Accordingly, a part to which the bars do not extend represents that the corresponding material (the electrode foil, the electrode slurry, or the insulating material) is not input to the electrode coating process. Consequently, from the data 250 on such input material status, it is possible to see in which section a specific material has been introduced in the electrode coating process.

In the present embodiment, data 221 on the loading amount of the electrode slurry input to the electrode coating process is displayed on the roll map in the longitudinal direction of the roll map. However, separately from the roll map, the data 221 is displayed under the roll map bars in the longitudinal direction of the roll map in parallel with the roll map. Since the data shows a distribution of the loading amount 260 according to the length of the electrode like a graph, it is possible to easily see information on an excessive or insufficient loading amount. Also, the value of a loading amount may be displayed together as necessary, and thus it is possible to intuitively see information on a loading amount.

At the upper end of the screen of FIG. 3, detailed data 230 on the model of an electrode roll, a process, production equipment, a lane number, a side of the electrode, etc. is displayed in addition to the lot number of the electrode roll. According to the present embodiment, in addition to the detailed data 230, a menu 231 relating to a input status (Input), the electrode (roll map) produced by input material (Output) and a measured value, a menu 232 relating to a selection of a side of the electrode, a menu 233 relating to screen zoom-in or zoom-out, and a menu 234 relating to other measured value options are displayed at the upper end of the screen. By selecting such menus, various types of roll maps 200 fit for the corresponding menus may be displayed on the screen.

At the upper end of the roll map screen of the present embodiment, the names of data relating to loading amounts and defects, data names relating to surface defects, and data names relating to sample examination are separately displayed to be easily distinguished. With such data names, the types of data displayed above the roll map bars may be simply distinguished.

On the roll map bars of FIG. 3, 1) data 225 on at least one of electrode dimensions and width, 2) data 226 on a mismatch between a coated electrode part and a non-coated electrode part, 3) the electrode slurry loading amount data 221, 4) electrode appearance defect data 223, 5) data 222*a* or 222*b* on the location of a disconnected section or inter-electrode connection, 6) data 229 on the location of a sample examination unit, 7) data 222*c* on an electrode discard section, 8) data 227 on insulating quality or defects in an insulating material coating process performed after electrode slurry coating, and 9) other defect data are displayed.

When the dimensions or width of the electrode deviates from a normal range, the data 225 on this is displayed in a quadrangle on the roll map, and the data 226 on the mismatch is also displayed in a thick quadrangle.

According to the present embodiment, the data 221 on an electrode slurry loading amount is displayed in more detail. In other words, the data 221 is displayed as a normal case 221*a*, an insufficient case 221*b* or 221*c*, or an excessive case 221*d* or 221*e* over a specific range on the roll map bar 210.

An electrode appearance defect is displayed as a circle, a black circle, or a black bar 223 at a specific spot on the roll map bars 210. In the present embodiment, appearance defects 223 are subdivided into pinholes, lines, and craters and displayed in different shapes on the roll map 200.

Also, the disconnected section 222*a* at which the disconnected electrode is connected with a coupling member, such as PET, and the inter-electrode connection section 222*b* may be displayed, and a PET connection section is displayed on the roll map in FIG. 3.

Further, an automatic mark section 228*a* which is a defective section measured and marked by, for example, a measuring instrument and a manual mark section 228*b* which is manually input for indication by an operator are displayed on the roll map. Since a start portion S and an end portion E of each section are displayed on the roll map, it is possible to see information on the length, the start point, and the end point of a corresponding section.

In addition, the outermost discard section 222*c* is displayed as a hatched portion on the roll map bars 210.

In the present embodiment, the electrode part 229 provided for sample examination is also subdivided into a self-test and a quality assurance (QA) test and displayed on the roll map bars 210.

The data (graph) 260 on the loading amount displayed in parallel with the roll map bars at the lower end of the embodiment of FIG. 3 shows a part 261 having an excessive loading amount and a part (the PET connection section) 262 not loaded with electrode slurry, which correspond to marks on the roll map bars 210 above the data 260.

As described above, the roll map 200 according to the present embodiment may display quality-related or defect-related data in a specific shape, color, etc. on a roll map bar synchronized with an electrode path and simultaneously display the current status of a material input to a coating process, important data of a loading amount, and detailed data of each point on the same roll map bar or the same screen. Accordingly, it is possible to see quality-related history information in an electrode coating process easily at a glance.

A method of generating a roll map of an electrode coating process for generating the roll map will be described below.

Figure 4:
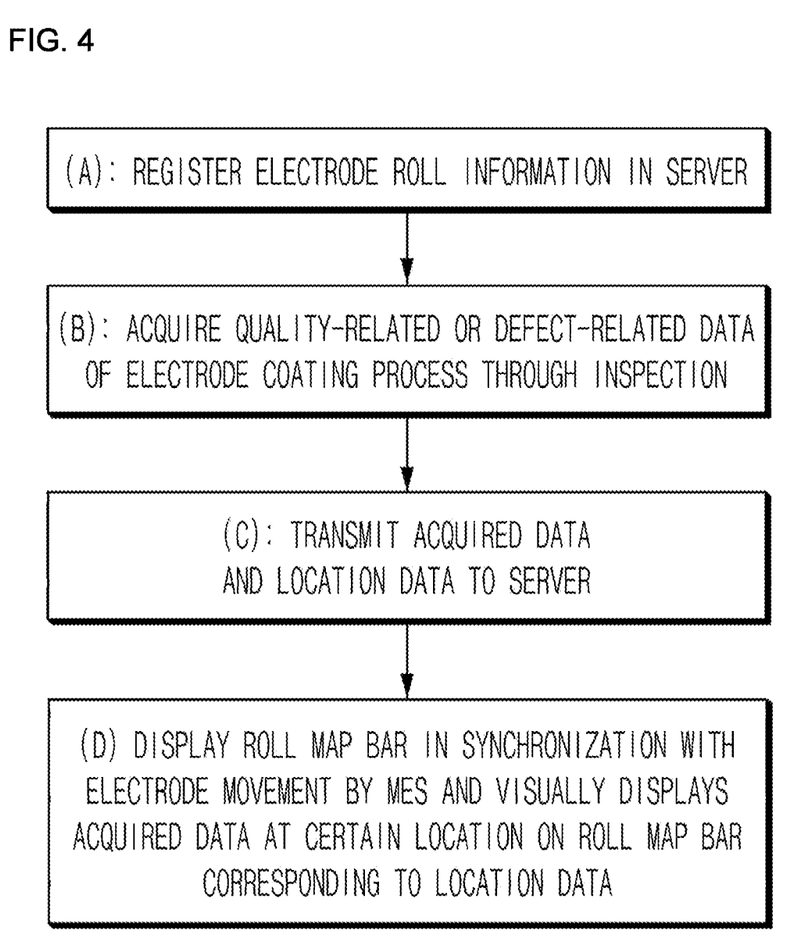
FIG. 4 is a flowchart illustrating a method of generating a roll map of an electrode coating process according to another embodiment.
Figure 5:
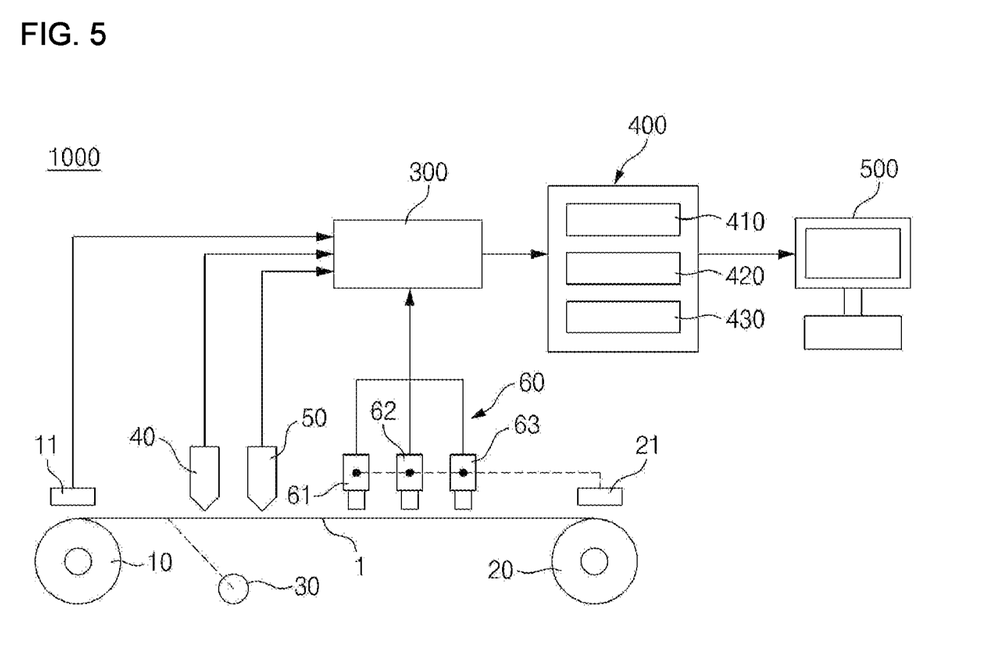
FIG. 5 is a schematic diagram illustrating a system for generating a roll map of an electrode coating process according to another embodiment.

FIG. 4 is a flowchart illustrating a method of generating a roll map of an electrode coating process according to an embodiment, and FIG. 5 is a schematic diagram illustrating a system for generating a roll map of an electrode coating process according to another embodiment.

An example of the method of generating a roll map of an electrode coating process includes an operation (operation (b) of FIG. 4) of acquiring at least one of quality-related data and defect-related data of an electrode coating process by inspecting the electrode coating process of coating an electrode moved between an unwinder and a rewinder in a roll-to-roll state with electrode slurry, an operation (operation (c) of FIG. 4) of transmitting the acquired data to a server together with data on a location in the electrode at which the data is acquired; and an operation (operation (d) of FIG. 4) in which a data system interconnecting with the server displays a roll map bar having a bar shape which simulates the electrode in the roll-to-roll state in synchronization with movement of the electrode between the unwinder and the rewinder and visually displays the at least one of the quality-related and defect-related data at a certain location on the roll map bar corresponding to the data on the location in the electrode.

Before the electrode coating process, it is preferable to precede an electrode roll information registration operation (operation (a) of FIG. 4) of inputting detailed data including the lot number of an electrode roll to the server when the electrode roll is installed in the roll-to-roll state between the unwinder and the rewinder. Referring to FIG. 5, when the electrode roll is introduced into an unwinder 10 or installed between the unwinder 10 and a rewinder 20, detailed data including the lot number of the electrode roll may be input to a server 300. This data may be manually input by an operator at, for example, a place where the unwinder 10 is installed or automatically input to the server 300 by scanning an indicator, such as a barcode or the like installed on the electrode roll, for checking detailed data in a process in which the electrode roll is automatically moved to the unwinder 10 by a robot or the like. When information on the electrode roll is registered in the server 300, detailed data, such as the lot number, a process, equipment, etc. on the electrode (roll) may be called from the server and displayed on the screen together with the generated roll map bar. Also, the specifications of the length and width of the electrode roll may be acquired from the detailed data of the electrode roll. Accordingly, when a roll map bar is generated by a data processing system, such as a manufacturing execution system (MES) or the like, the shape and size of the roll map bar may be determined at a certain scale which is proportional to the length and width of the electrode. In other words, the roll map bar may be displayed in a shape and size fit for the length and width of the electrode roll according to a conversion scale stored in the MES or the like. The data processing system is a system (including hardware or software) that performs input, processing, output, communication, etc. to perform a series of manipulations on data. An example of such a data processing system may be the MES as described above.

Meanwhile, to generate the roll map, it is necessary to acquire quality-related or defect-related data of an electrode coating process and data on a location in an electrode at which the data is acquired.

The quality-related or defect-related data may be obtained by inspecting an electrode 1 moving in the electrode coating process. As shown in FIG. 5, one side or both sides of the electrode 1 are coated by an electrode slurry coater 40 and an insulating material coater 50 while moving between the unwinder 10 and the rewinder 20.

When there is a foreign material or fault in the electrode 1 before coating, the corresponding portion may be cut off and discarded to a defect removal port 30, and the electrode and another electrode may be directly connected or connected using a coupling member such as PET or the like. Even when a fault occurs on the electrode or the electrode is disconnected due to excessive tension after coating, the electrode may be connected. Also, outermost portions corresponding to the start point and end point of the electrode may not be of uniform quality and thus are cut off and discarded. Such an electrode connection section or discard section may be automatically or manually measured. For example, when the operator connects a disconnected section, the location of the section may be directly input to the server or data processing system or may be input to an additional input device (not shown) which may communicate with the server 300 and the like and installed in an electrode coating line. Alternatively, the operator may directly attach an indicator tag to the disconnected section or connection section on the electrode.

After coating, the electrode 1 is inspected by a predetermined measuring instrument 60 installed in the electrode coating process line. For example, measuring instruments such as an electrode slurry loading amount measuring instrument 61, a dimension and width measuring instrument 62, and an appearance inspection device 63 may be installed in the line. The electrode slurry loading amount measuring instrument 61 may employ a non-contact thickness measurement sensor, such as an ultrasonic sensor, a displacement sensor, a laser sensor, a confocal thickness sensor, etc. Since the thickness of electrode foil is known, a slurry loading amount may be measured by analyzing the wavelength of reflected light of light emitted from, for example, the confocal thickness sensor and calculating the distance (thickness) between the sensor and the electrode.

The dimension and width measuring instrument 62 may employ a type of vision measuring instrument for measuring an electrode width, the widths of a coated part and non-coated part, etc. by imaging or scanning the appearance of the electrode being coated. When the widths of the coated part and non-coated part are acquired, whether there is a mismatch between the coated part and non-coated part may be determined as shown on the lower left side in FIG. 2.

The appearance inspection device 63 may acquire an appearance image as shown on the lower right side in FIG. 2 by imaging the appearance of the electrode. From this, data on appearance defects, such as pinholes, lines, and crater shapes, may be obtained, and data on insulating appearances or insulating defects may also be acquired. The appearance inspection device 63 may include a sensor, for example, a color sensor, for determining the color of the electrode. The color sensor may detect a part, for example, a PET coupling member, having a different color than the electrode.

The above measuring instruments are exemplary for the description. The measuring instruments are not limited to any type as long as quality-related or defect-related data of an electrode coating process can be acquired.

Meanwhile, the fore-end part of the electrode from which electrode coating is started is coated by the electrode slurry coater or the like with coating conditions, such as a loading amount and the like, being adjusted. In this part, a loading amount may be changed. Accordingly, data on such a condition adjustment section may also be acquired by the measuring instrument 60, and the data may be displayed on the roll map bar.

Figure 6:
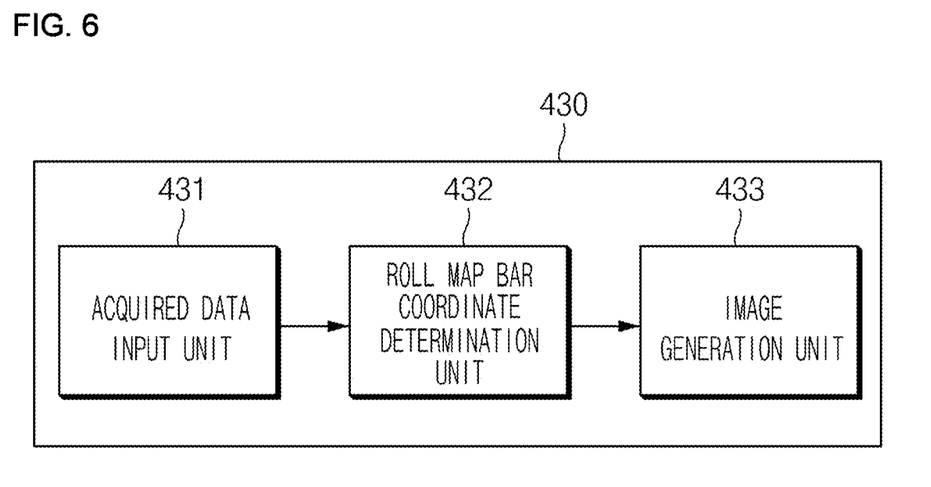
FIG. 6 is a schematic diagram of a data visualization device for generating a roll map of an electrode coating process according to another embodiment.

When quality-related or defect-related data is acquired by various measuring instruments or the operator as described above, the data is transmitted to the server 300. Referring to FIG. 6, various measuring instruments 60, such as the electrode slurry coater 61, the insulating material coater 62, the appearance inspection device 63, etc., are connected to the server 300, and thus data on coating conditions and the like of the coating process may be stored in the server 300. Also, data acquired by the various measuring instruments 60 may be stored in the server 300. Further, data manually input by the operator through an additional input device (not shown) may be stored in the server 300.

To display the quality-related or defect-related data on the roll map, it is necessary to specify data on a location in the electrode at which the data is acquired. In other words, assuming that the roll map bar is a coordinate system including two coordinate axes in the longitudinal direction and width direction, in order to input (display) specific data (related to quality of defects) at a specific location (coordinates) in the coordinate system, it is necessary to acquire location data of the electrode which is a base for extracting the location (coordinates).

As one embodiment, location data based on the longitudinal direction of the electrode may be detected by an encoder installed in the unwinder 10 or the rewinder 20. As shown in FIG. 5, encoders 11 and 21 are installed on the unwinder 10 or the rewinder 20. For convenience of illustration, the encoders 11 and 21 are shown to be installed outside the unwinder 10 or the rewinder 20, but the encoders may be embedded in the unwinder 10 and the like. In general, the encoders 11 and 21 may be installed in a motor drive unit which drives the unwinder 10 or the rewinder 20 and may detect an electrode movement distance according to the number of motor rotations. Accordingly, when the electrode moves between the unwinder 10 and the rewinder 20, the movement distance can be detected by the encoders 11 and 21. For example, when the electrode 1 is disconnected, the disconnected electrode is removed at the defect removal port 30, and the connection section is input to the server through the input device by the operator, the encoder 11 of the unwinder detects the disconnected location (a longitudinal distance) of the electrode, and data (the distance data between the start point and end point of the cut) on the location of the electrode connection section may be input together. Otherwise, when the electrode is disconnected after coating and thus is connected with a coupling member, such as PET or the like, the electrode may be moved and come under the appearance inspection device 63, and then the appearance inspection device 63 may recognize the coupling member. In this case, when the encoder 21 of the rewinder 20 is allowed to interconnect with the appearance inspection device 63 or perform data communication with the appearance inspection device 63 in a wired or wireless manner, the appearance inspection device 63 may acquire data (the longitudinal location data) on the coupling member section detected by the encoder 21 of the rewinder 20. Accordingly, the appearance inspection device 63 may acquire data on a coupling member image acquired by the inspection device and the location data of the coupling member section together. As shown in FIG. 5, the encoder 21 of the rewinder 20 is connected to the loading amount thickness measuring instrument 61 and the dimension and width measuring instrument 62 in addition to the appearance inspection device 63 and thus may acquire longitudinal location data of the electrode whose loading amount has been measured and longitudinal location data of the electrode whose dimensions or width has been measured together with the loading amount and dimension/width information. As necessary, the encoder 11 of the unwinder 10 may also be connected to the various measuring instruments 60.

Meanwhile, location data based on the width direction of the electrode may be detected by the certain measuring instrument 60 that inspects the electrode coating process. The measuring instrument 60, such as the loading amount thickness measuring instrument or the like, shown in FIG. 5 may be installed to be plural in number in the width direction of the electrode or installed to be movable in the width direction of the electrode. Accordingly, the measuring instruments 60 may acquire quality-related or defect-related data (e.g., loading amount data or appearance defect data) at predetermined intervals from each point in the width direction of the electrode. Also, data on a widthwise location at which the corresponding data is acquired may be acquired by the measuring instrument 60. Each of the measuring instruments 60 is connected to the encoder 11 or 21 of the unwinder 10 or rewinder 20 for data communication and thus may acquire all quality-related or defect-related data and data on the longitudinal location and widthwise location in the electrode at which the data is acquired. Such data is transmitted to the server 300 connected to the measuring instruments and stored in the server (see FIG. 5).

As shown in FIG. 5, the data stored in the server 300 is transmitted to a data processing system such as an MES 400. The MES 400 indicates software that performs production management in the manufacturing field to reduce costs, control quality, and perform low-cost high-efficiency production on the basis of factory data or a data processing system including the software. In the embodiment shown in FIG. 5, a database 410 is installed in the MES 400. However, the database 410 may be separately provided from the MES 400. The database 410 stores various data related to product production in the factory. With regard to roll map generation, quality-related data in the electrode coating process is included in the database 410. The quality-related data may be, for example, standard information on a normal range or optimization range of a loading amount or the like, information on an allowable range on the size or width of appearance defects and a mismatch tolerance range, etc. A quality management unit or central processing unit 420 installed in the MES 400 may compare the data received from the server 300 with quality data stored in the database 410. Quality data of a loading amount or coated part and non-coated part widths is compared with measurement data acquired from a measuring instrument to determine whether the loading amount is normal, insufficient, or excessive or whether the loading amount is within the mismatch tolerance range. Alternatively, it is determined through the comparison whether the size or width of an appearance defect is within the allowable range and the like. In other words, the quality management unit or central processing unit 420 of the MES 400 may compare data acquired by a measuring instrument and the like with quality data of the database 410 to determine whether the acquired data deviates from normal quality data. When the acquired data deviates from the normal quality data, a part of the roll map bar corresponding to the acquired data may be marked in, for example, another color or shape to be visually distinguished from other parts, which will be described below.

Meanwhile, the quality-related or defect-related data received from the server 300 and location data of the electrode or data of which the favorableness or defect is determined in comparison with the quality data of the database is visualized and displayed as a roll map on a display unit 500 by a data visualization device 430 installed in the MES 400.

FIG. 6 is a schematic diagram of the data visualization device 430 for generating a roll map of an electrode coating process.

As shown in the drawing, the data visualization device 430 includes an acquired data input unit 431, a roll map bar coordinate determination unit 432, and an image generation unit 433.

First, the acquired data input unit 431 receives data from the server or the quality management unit or central processing unit 420.

The roll map bar coordinate determination unit 432 may define a visualization area in which a roll map will be formed and define pixel coordinate values for each data element of the acquired source data in the visualization area. When data on specifications, such as the lot number, the length, the width, etc., of the electrode roll is input to the server 300 and the MES 400 through registration of electrode roll information, the roll map bar coordinate determination unit 432 may calculate and determine the visualization area of the roll map bar according to a certain conversion scale from the data on the size of the electrode. Otherwise, the visualization area of the roll map bar may be calculated and determined according to a certain conversion scale from the above-described data on the longitudinal and widthwise location in the electrode.

The coordinate determination unit 432 may map the acquired quality-related or defect-related data to (widthwise and longitudinal) location data of the electrode and allocate the mapped data to the visualization area (the roll map bar) according to pixel coordinates.

The image generation unit 433 may represent the mapped data element allocated to each pair of pixel coordinates in the visualization area as at least one legend. Legends are various shapes, such as a circle, a quadrangle, a triangle, etc., displayed in a visualization area or the shapes or the like given a color. Accordingly, various quality-related or defect-related data is visually displayed at pixel coordinates (coordinates on the roll map bar) corresponding to each piece of location data of the actual electrode in the visualization area, which is called the roll map bar, in a form, a shape, and a color specified for each piece of data and implemented on the roll map bar by the image generation unit 433 such that a roll map can be generated.

Also, the quality-related or defect-related data and the data on a location at which the data is acquired is stored in the server 300. Accordingly, the central processing unit 420 and the data visualization device 430 may be configured to load the data corresponding to a specific range of the roll map bar onto the same screen as the roll map bar 110 as shown in FIG. 2. As described above, a roll map can be implemented for each lane of the electrode, a top surface and a bottom surface, or both sides of the electrode. Otherwise, as described above, data on current status of a material input to the electrode coating process can be received from, for example, the server 300 connected to the coaters 40 and 50 and displayed together with the roll map, or loading amount data, which is important data, can be separately extracted and displayed in parallel with the roll map.

Setting the size of the visualization area or generation of an image by detecting coordinates of the visualization area may be performed by various existing user interfaces or various programs or processing tools relating to data allocation-processing-analysis and visualization. Accordingly, the above-described method of generating a roll map is only one example, and the present invention is not limited to the above-described embodiment.

FIG. 5 shows the above-described system 1000 for generating a roll map. As shown in the drawing, the system 1000 for generating a roll map of an electrode coating process includes: the measuring device 60 which acquires at least one of quality-related data and defect-related data of an electrode coating process by inspecting an electrode coating process and transmits the acquired data to a server together with data on a location in an electrode at which the data is acquired; the server 300 which stores the data received from the measuring device; the MES 400 generating a roll map which displays, in conjunction with the server 300, a roll map bar having a bar shape that simulates an electrode in the roll-to-roll state in synchronization with movement of the electrode between the unwinder 10 and the rewinder 20 and visually displays the at least one of the quality-related and defect-related data at a predetermined location on the roll map bar corresponding to the data on the location in the electrode on the basis of the quality-related or defect-related data received from the server 300 and the data of the location in the electrode at which the data is acquired; and the display unit 500 which is connected to the MES 400 and displays the roll map on a screen. The MES 400 includes the database 410 in which the quality data of the electrode coating process is stored, the quality management unit (central processing unit) 420 which makes a determination on acquired data in comparison with the quality data, and the data visualization device 430 which visually displays, on the basis of the acquired data, the roll map bar and a representation part that visually shows the data on the roll map bar.

As described above, with a roll map, it is possible to visually recognize quality-related or defect-related data of an electrode coating process at a glance with ease. Due to the roll map, even when an electrode is used for assembly or a battery is manufactured with the electrode in a follow-up process, it is possible to easily find the cause of a post-assembly fault or defect from the roll map data of the corresponding electrode as long as the lot number or specification information of the battery or electrode is known. Therefore, it is possible to carry out inter-process quality relationship analysis with high accuracy.

The present invention has been described in detail with reference to the drawings, embodiments, etc. However, a configuration illustrated in drawings or embodiments described in this specification is only an embodiment of the present invention and does not represent the entire technical spirit of the present invention. Therefore, it should be understood that various equivalents and modifications capable of replacing the embodiment may be present at the time of filing of the present application.

DESCRIPTION OF SIGNS

1: electrode
10: unwinder
20: rewinder
30: defect removal port
40: electrode slurry coater
50: insulating material coater
60: measuring instrument (measuring device)
61: electrode slurry loading amount measuring instrument
62: dimension and width measuring instrument
63: appearance inspection device
100: roll map
110: roll map bar
120: quality-related or defect-related data
121: loading amount data
122: disconnected section data
123: appearance defect data
124: insulating appearance data
125: dimension/width data
126: mismatch data
127: insulating defect data
128: other defect data
129: sample examination data
130: detailed data
140: electrode dimension
150: detailed information
160: appearance information
200: roll map
210: roll map bar
220: quality-related or defect-related data
221: loading amount data
222a: polyethylene terephthalate disconnected section data
222b: inter-electrode connection data
222c: outermost discard section data
223: appearance defect data
225: dimension/width data
226: mismatch data
227: appearance insulating defect data
228a: defect display (automatic) data
228b: defect display (manual) data
229: sample examination data
230: detailed data
240: electrode dimensions
250: current coating material input status
260: loading amount data (graph)
300: server 400: manufacturing execution system
410: database
420: quality management unit (central processing unit)
430: data visualization device
431: acquired data input unit
432: roll map bar coordinate determination unit
433: image generation unit
500: display unit

The invention claimed is:

1. A roll map of an electrode coating process, comprising:
a roll map bar that is displayed on a screen that simulates an electrode moved in a roll-to-roll state between an unwinder and a rewinder while being coated with an electrode slurry, the roll map bar displayed in a form of a bar simulating the electrode in the roll-to-roll state; and
a representation part configured to visually show data related to a loading amount of the electrode slurry measured in the electrode coating process, the data being shown on the representation part along a longitudinal direction of the roll map bar.

2. The roll map of claim 1, wherein the representation part is configured to visually show at least one of quality-related and defect-related acquired data associated with the electrode coating process other than the data related to the loading amount of the electrode slurry, the acquired data being shown on the representation part at a certain location on the roll map bar corresponding to a location in the electrode at which the data is measured.

3. The roll map of claim 1, wherein a longitudinal dimension of the electrode is displayed at certain intervals in a longitudinal direction of the roll map bar.

4. The roll map of claim 1, wherein detailed data is displayed together with the roll map bar, and wherein the detailed data includes a lot number of the electrode installed between the unwinder and the rewinder in the roll-to-roll state.

5. The roll map of claim 2, wherein at least one of the acquired data and the data related to the loading amount of the electrode slurry is measured by a predetermined measuring instrument or operator.

6. The roll map of claim 1, wherein the acquired data is selected from a group comprising 1) data on at least one of electrode dimensions and width, 2) data on a mismatch between a coated electrode part of the electrode and a non-coated electrode part of the electrode, 3) electrode appearance defect data, 4) data on a location of a disconnected section of an electrode or inter-electrode connection, 5) data on a location of a sample examination unit, 6) data on a location of an electrode discard section of an electrode, 7) data on insulating quality or defects in an insulating material coating process performed after electrode slurry coating, and 8) other defect data.

7. The roll map of claim 2, wherein the roll map bar is configured for having a specific range of the roll map bar on the screen specified and clicked such that at least one of the acquired data and the data related to the loading amount of the electrode slurry in a range on the electrode corresponding to the specific range is visually displayed on the screen separately from the roll map bar.

8. The roll map of claim 6, wherein the roll map bar is configured for having the electrode appearance defect data on the roll map bar clicked such that an appearance image of the electrode photographed by an appearance inspection device is visually displayed on the screen separately from the roll map bar.

9. The roll map of claim 8, wherein, when the appearance image is displayed, detailed information including location coordinates of an appearance defect photographed by the appearance inspection device is displayed together with the appearance image.

10. The roll map of claim 1, wherein the roll map is displayed on the screen for each lane on the electrode where the electrode slurry coats the electrode.

11. The roll map of claim 1, wherein the electrode is a double-sided electrode and roll maps for a top surface and a bottom surface of the double-sided electrode are displayed on the same screen.

12. The roll map of claim 1, wherein at least one of data on an input status of electrode foil, the electrode slurry, and an insulating material input to the electrode coating process and data on a loading amount of the electrode slurry input to the electrode coating process is visually displayed on the screen in parallel with the roll map in a longitudinal direction of the roll map.

13. A method of generating a roll map of an electrode coating process, the method comprising:
acquiring data related to a loading amount of the electrode slurry from the electrode coating process by inspecting an electrode coating process of coating an electrode slurry on an electrode that is moved between the unwinder and the rewinder in a roll-to-roll state;
transmitting the data related to the loading amount of the electrode slurry to a server together with data on a location in the electrode at which the data is acquired; and
displaying, by a data processing system interconnecting with the server, a roll map bar having a bar shape which simulates an electrode moved in the roll-to-roll state between the unwinder and the rewinder on a screen and visually displaying the data related to a loading amount of the electrode slurry of the electrode coating process along a longitudinal direction of the roll map bar.

14. The method of claim 13, wherein when inspecting the electrode coating process,
acquiring at least one of quality-related and defect-related acquired data associated with the electrode coating process other than the data related to the loading amount of the electrode slurry,
transmitting the acquired data to the server together with data on a location in the electrode at which the acquired data is acquired, and
visually displaying the at least one of the quality-related and defect-related data of the electrode coating process at a certain location on the roll map bar corresponding to the data on the location in the electrode.

15. The method of claim 13, further comprising, when an electrode roll is installed in the roll-to-roll state between the unwinder and the rewinder before the electrode coating process, an electrode roll information registration operation of inputting detailed data including a lot number of the electrode roll to the server is preceded,
wherein the detailed data is displayed on the screen together with a roll map.

16. The method of claim 14, wherein at least one of the acquired data and the data related to the loading amount of the electrode slurry is acquired by a predetermined measuring instrument or by an operator inspecting the electrode coating process, and
wherein the at least one of the acquired data and the data related to the loading amount of the electrode slurry acquired by the predetermined measuring instrument or the operator is transmitted to the server.

17. The method of claim 16, wherein the predetermined measuring instrument is an electrode slurry loading amount measuring instrument, a dimension measuring instrument, or an appearance inspection device.

18. The method of claim 13, wherein location data based on a longitudinal direction of the electrode is detected by an encoder installed on the unwinder or the rewinder.

19. The method of claim 18, wherein location data based on a width direction of the electrode is detected by a predetermined measuring instrument which inspects the electrode coating process.

20. The method of claim 14, further comprising:
comparing the at least one of the acquired data and the data related to the loading amount of the electrode slurry with quality data stored in a database installed in a data processing system or installed to interconnect with the data processing system; and
marking the at least one of the acquired data and the data related to the loading amount of the electrode slurry which is determined to deviate from normal quality data as a result of the comparison on the roll map bar to be visually distinguished from other parts.

21. The method of claim 13, further comprising visually displaying at least one of data on an input status of an electrode foil, the electrode slurry, and an insulating material input to the electrode coating process and data on a loading amount of the electrode slurry input to the electrode coating process on the screen in parallel with a roll map in a longitudinal direction of the roll map.

22. A system for generating a roll map of an electrode coating process, the system comprising:
a measuring device configured to inspect an electrode coating process, acquire data related to a loading amount of the electrode slurry of the electrode coating process, and transmit the data related to the loading amount of the electrode slurry to a server together with data on a location in an electrode at which the data is acquired;
the server configured to store the data received from the measuring device;
a data processing system configured to interconnect with the server to display a roll map bar having a bar shape simulating an electrode moved in a roll-to-roll state between an unwinder and a rewinder, and to generate a role map on the basis of the data related to the loading amount of the electrode slurry received from the server and the data on the location in the electrode at which the data is acquired, wherein the roll map visually displays the data related to the loading amount of the electrode slurry along a longitudinal direction of the roll map bar; and
a display unit connected to the data processing system and configured to display the roll map on a screen.

23. The system of claim 22, wherein
the measuring device is configured to acquire at least one of quality-related and defect-related acquired data associated with the electrode coating process other than the data related to the loading amount of the electrode slurry, transmit the acquired data to the server together with data on a location in the electrode at which the acquired data is acquired, and
the display unit connected to the data processing system is configured to visually display the at least one of the quality-related and defect-related data of the electrode coating process at a certain location on the roll map bar corresponding to the data on the location in the electrode.

\* \* \* \* \*